Patented Feb. 23, 1943

2,312,267

UNITED STATES PATENT OFFICE 2,312,267

PROCESS FOR MAKING FLUORESCENT MATERIAL

Willard A. Roberts, Euclid, Ohio, assignor to General Electric Company, a corporation of New York No Drawing. Application January 16, 1941, Serial No. 374,737

11 Claims. (Cl. 250—81)

My invention relates to fluorescent materials and more particularly to a process for improving the quality and uniformity of such materials.

In the preparation of certain tungstate phosphors, calcium tungstate and strontium tungstate for example, by firing tungstic oxide with a compound of the base metal involved, considerable variation in brightness and uniformity of the resultant fluorescent material is experienced with different batches of the oxide. The purification of the tungstic oxide has not greatly improved the results. The cause of the phenomenon can probably be traced to residues of the original ingredients remaining in the end product of the reaction. It is known that excesses of certain of these materials sometimes have deleterious effects upon the brightness of the fluorescent product. I have found that the brightness can be greatly improved and uniform results obtained with almost all batches by using an excess of some of the original ingredients and by adding materials which will remove the harmful constituents by driving the reaction to completion.

It is accordingly an object of the invention to provide a process for improving the brightness and uniformity of the fluorescent tungstates. It is a further object of the invention to improve the brightness and uniformity of such tungstates by insuring the completion of the reaction between the initial ingredients of the process. Further objects and advantages of the invention will appear from the following detailed description thereof.

In one method of preparing lead-activated calcium tungstate, an intimate mixture of calcium oxide, tungstic oxide and lead acetate is fired for four hours, more or less, at temperatures of the order of 1000° C. Since the reaction is to some extent reversible, certain amounts of calcium oxide and tungstic oxide tend to remain in the end product with attendant deleterious effect on the brightness of the fluorescent material. It is probable that the varying amounts of these remaining oxides cause the difference in brightness which is experienced in different batches as already mentioned. Excess tungstic oxide is known to produce a poor and discolored phosphor. On the other hand, any calcium oxide left over in the end product tends to react with atmospheric moisture to form calcium carbonate which likewise has a harmful effect on brightness.

If now the calcium oxide is added to the above reaction in excess, it is insured that substantially all the tungstic oxide combines with some of the calcium oxide to form the desired tungstate. The free tungstic oxide together with its harmful effects are thus removed. I have also found that the excess calcium oxide may be removed by the addition of a certain amount of sulphuric acid which tends to convert the excess oxide into the sulphate. The essential requirement is that there exist an excess of calcium in the form of the sulphate. Tests have shown that the addition of from 5 to 10 per cent of the sulphuric acid to the mixture before firing will produce a phosphor of good brightness from all lots of pure tungstic oxide. The amount of the sulphuric acid used is about 25 per cent of that required to change the calcium oxide to the calcium sulphate. The net result of both the foregoing steps is that substantially all free tungstic oxide and calcium oxide is removed from the final product.

While I do not wish to state it as a positive fact, there is some indication that the calcium sulphate which remains in excess will combine with any excess lead acetate to form a lead activated calcium sulphate having a slight fluorescent output in the blue region. This, of course, enhances the blue output of the calcium tungstate and may be mentioned as a further advantage of the invention. I have also found some evidence to indicate that some of the calcium sulphate is activated by the tungstic oxide itself to give additional fluorescence and to further add to the cleanup of the tungstic oxide. It is known that, by itself, calcium sulphate activated by tungstic oxide is phosphorescent. For example, 1 per cent of tungstic oxide in calcium sulphate gives a fairly bright phosphor of approximately same color as that of calcium tungstate.

Somewhat the same results may be obtained if instead of adding sulphuric acid, calcium sulphate in excess is used as the original ingredient in place of the calcium oxide. However, in this case, the heating then may be longer and the powder not so bright. The following table will serve to illustrate the improvement in the relative brightness obtained by using the process of the invention with different lots A, B, C, D and E of tungstic oxide for mixtures of various compositions by relative number of parts, including the case where the sulphates alone are used and the first described case where sulphuric acid is added to the oxide mixture.

| Lot WO₃ | Relative fluorescent brightness | | | | | |
|---|---|---|---|---|---|---|
| | A | A<br>WO₃ unfired before mixing | B | C | D | E |
| (20) calcium oxide<br>(75) tungstic oxide<br>(1.8) lead acetate<br>+8 sulphuric acid | 100<br>115 | 76<br>113 | 95<br>112 | 105<br>113 | 107<br>115 | 80<br>115 |
| (61) calcium sulphate)<br>(75) tungstic oxide<br>(1.8) lead acetate)<br>+8 sulphuric acid | | 110<br>110 | 110<br>111 | | | |
| (35) calcium carbonate)<br>(75) tungstic oxide<br>(1.8 lead acetate)<br>+8 sulphuric acid | | 88<br>112 | 92<br>113 | | | |
| (20 calcium oxide)<br>(75) tungstic oxide<br>(1.8 lead–1.9 lead sulfide)<br>+8 sulphuric acid | | 80<br>114 | 98<br>113 | | | |

The same improved results may be obtained in the case of other phosphors by applying the principles of the invention. For example, in the manufacture of strontium tungstate, as disclosed in my co-pending application No. 374,739 filed January 16, 1941 the brightness and uniformity of the product may be improved by the addition of sulphuric acid or other sulphates as outlined above. Here, as above, the excess strontium oxide drives the reaction with the tungstic oxide to completion, while the use of the sulphates insures that the end product contains no free strontium oxide.

It will be understood that my invention as hereinafter claimed is not to be limited by any recitation herein of the theory of the process but only by the manipulation thereof as described. Further, it will be understood that many variations in the relative proportions and perhaps in the materials themselves may occur to those skilled in the art to which the invention appertains. All such I aim to include within the scope of the appended claims.

What I claim as new and desire to secure by Letters Patent of the United States is:

1. The method of producing a tungstate phosphor which comprises firing a mixture of materials, including tungstic oxide and an excess of a compound of a base metal, which will react to leave a fluorescent tungstate of the base metal and a sulphate of the base metal.

2. The method of improving the brightness and uniformity of a tungstate phosphor in which tungstic oxide and an excess of a metallic oxide are ingredients of the mixture before firing which comprises adding from 5 to 10 per cent of sulphuric acid to said mixture and then firing the mixture.

3. The method of improving the brightness and uniformity of a tungstate phosphor which comprises the step of adding a quantity of sulphuric acid to a mixture of tungstic oxide, an excess of a metallic oxide and an activator, and then firing the mixture.

4. The method of improving the brightness and uniformity of a tungstate phosphor which comprises the step of adding a quantity of from 5 to 10 per cent of sulphuric acid to a mixture of tungstic oxide, an excess of a metallic oxide and an activator and then firing the mixture.

5. The method of improving the brightness and uniformity of a tungstate phosphor which comprises the step of adding to a mixture of tungstic oxide, an excess of a metallic oxide and an activator before firing, a quantity of sulphuric acid equal to about 25 per cent to that necessary to convert the calcium oxide to calcium sulphate, and then firing the mixture.

6. The method of producing a tungstate phosphor which comprises the steps of intimately admixing a quantity of tungstic oxide, a metallic sulphate in excess of the amount required to form the tungstate and an activator and firing said admixture.

7. The method of producing a tungstate phosphor which comprises the steps of intimately admixing a quantity of tungstic oxide, a metallic oxide in excess of the amount required to form the tungstate and an activator and adding to said admixture a quantity of sulphuric acid, and then firing the mixture.

8. The method of producing a tungstate phosphor which comprises the steps of intimately admixing a quantity of tungstic oxide, a metallic oxide in excess of the amount required to form the tungstate and an activator and adding to said admixture a quantity of about 5 to 10 per cent of sulphuric acid, and then firing the mixture.

9. The method of producing a tungstate phosphor which comprises the steps of intimately admixing a quantity of tungstic oxide, a metallic oxide in excess of the amount required to form the tungstate and an activator and adding to said admixture a quantity of sulphuric acid equal to about 25 per cent of that necessary to convert the metallic oxide to the sulphate, and then firing the mixture.

10. A fluorescent material comprising a tungstate of a base metal containing an excess of the metal in the form of a sulphate of the metal.

11. A fluorescent material comprising calcium tungstate containing an excess of calcium in the form of calcium sulphate.

WILLARD A. ROBERTS.